(12) United States Patent
Daniels

(10) Patent No.: US 9,542,814 B2
(45) Date of Patent: Jan. 10, 2017

(54) GAMING SYSTEM AND METHOD FOR PROVIDING A NUDGE POKER GAME

(75) Inventor: David W. Daniels, Reno, NV (US)

(73) Assignee: IGT, Las Vegas, NV (US)

(*) Notice: Subject to any disclaimer, the term of this patent is extended or adjusted under 35 U.S.C. 154(b) by 798 days.

(21) Appl. No.: 13/474,514

(22) Filed: May 17, 2012

(65) Prior Publication Data

US 2013/0310126 A1   Nov. 21, 2013

(51) Int. Cl.
*G07F 17/32* (2006.01)
*A63F 13/335* (2014.01)

(52) U.S. Cl.
CPC .......... *G07F 17/3293* (2013.01); *G07F 17/32* (2013.01); *A63F 13/335* (2014.09)

(58) Field of Classification Search
CPC ... G07F 17/32; G07F 17/3265; G07F 17/3293
USPC .......................................................... 463/13
See application file for complete search history.

(56) References Cited

U.S. PATENT DOCUMENTS

| | | |
|---|---|---|
| 5,100,137 A | 3/1992 | Fulton |
| 5,167,413 A | 12/1992 | Fulton |
| 5,251,897 A | 10/1993 | Fulton |
| 5,308,065 A | 5/1994 | Bridgeman et al. |
| 5,332,219 A | 7/1994 | Marnell, II et al. |
| 5,374,067 A | 12/1994 | Jones |
| 5,382,025 A | 1/1995 | Sklansky et al. |
| 5,411,257 A | 5/1995 | Fulton |
| 5,437,451 A | 8/1995 | Fulton |
| 5,531,448 A | 7/1996 | Moody |
| 5,591,081 A | 1/1997 | Suzuki |
| 5,732,950 A | 3/1998 | Moody |
| 5,755,621 A | 5/1998 | Marks et al. |
| 5,803,809 A | 9/1998 | Yoseloff |
| 5,820,460 A | 10/1998 | Fulton |
| 5,823,873 A | 10/1998 | Moody |
| 5,947,831 A | 9/1999 | McCarthy |
| 6,007,066 A | 12/1999 | Moody |
| 6,050,658 A | 4/2000 | O'Sullivan et al. |
| 6,098,985 A | 8/2000 | Moody |
| 6,110,040 A | 8/2000 | Sanduski et al. |
| 6,257,979 B1 | 7/2001 | Walker et al. |
| 6,299,170 B1 | 10/2001 | Yoseloff |
| 6,311,978 B1 | 11/2001 | Moody |
| 6,334,613 B1 | 1/2002 | Yoseloff |
| 6,422,940 B1 | 7/2002 | Walker et al. |
| 6,464,581 B1 | 10/2002 | Yoseloff et al. |
| 6,474,645 B2 | 11/2002 | Tarantino |
| 6,517,074 B1 | 2/2003 | Moody et al. |
| 6,561,898 B2 | 5/2003 | Moody |
| 6,568,680 B1 | 5/2003 | Moody et al. |
| 6,652,377 B1 | 11/2003 | Moody |
| 6,672,959 B2 | 1/2004 | Moody et al. |
| 6,729,961 B1 | 5/2004 | Millerschone |
| 6,935,950 B2 | 8/2005 | Tarantino |
| 6,955,356 B2 | 10/2005 | Moody |
| 6,964,416 B2 | 11/2005 | McClintic et al. |
| 6,991,538 B2 | 1/2006 | Cannon |
| 6,994,624 B2 | 2/2006 | Gold et al. |
| 7,022,016 B2 | 4/2006 | Wood et al. |

(Continued)

*Primary Examiner* — Omkar Deodhar
*Assistant Examiner* — Shauna-Kay Hall
(74) *Attorney, Agent, or Firm* — Neal, Gerber & Eisenberg LLP

(57) ABSTRACT

A gaming system for providing a poker game with a playing card nudge feature.

32 Claims, 11 Drawing Sheets

(56) References Cited

U.S. PATENT DOCUMENTS

| | | |
|---|---|---|
| 7,056,206 B2 | 6/2006 | Aoki et al. |
| 7,059,965 B2 | 6/2006 | Jackson |
| 7,137,628 B2 | 11/2006 | Moody |
| 7,156,397 B2 | 1/2007 | Moody et al. |
| 7,222,856 B2 | 5/2007 | Dodge |
| 7,247,092 B2 | 7/2007 | Jarvis et al. |
| 7,297,057 B2 | 11/2007 | Gerrard et al. |
| 7,354,344 B2 | 4/2008 | Paulsen et al. |
| 7,419,162 B2 | 9/2008 | Lancaster et al. |
| 7,476,542 B2 | 1/2009 | Walker et al. |
| 7,524,243 B2 | 4/2009 | Bansemer et al. |
| 7,641,197 B2 | 1/2010 | Jackson |
| 7,658,672 B1 | 2/2010 | Wolf et al. |
| 7,749,059 B2 | 7/2010 | Tarantino |
| 7,785,188 B2 | 8/2010 | Cannon |
| 7,803,041 B2 | 9/2010 | Gold et al. |
| 7,803,043 B2 | 9/2010 | Jackson |
| 7,815,500 B2 | 10/2010 | Montross et al. |
| 7,837,545 B2 | 11/2010 | Blair, Jr. et al. |
| 7,857,693 B1 | 12/2010 | Johnson et al. |
| 7,993,191 B2 | 8/2011 | Evans et al. |
| 2004/0048650 A1 | 3/2004 | Mierau et al. |
| 2005/0202863 A1 | 9/2005 | Macaulay |
| 2006/0030403 A1 | 2/2006 | Lafky et al. |
| 2006/0046830 A1 | 3/2006 | Webb |
| 2006/0113729 A1 | 6/2006 | Dodge |
| 2006/0287033 A1 * | 12/2006 | Rozkin et al. .................. 463/13 |
| 2007/0054721 A1 | 3/2007 | Jackson |
| 2007/0060241 A1 | 3/2007 | Low et al. |
| 2007/0066377 A1 | 3/2007 | Van Asdale |
| 2008/0064462 A1 | 3/2008 | Gerrard et al. |
| 2008/0076532 A1 | 3/2008 | Graham et al. |
| 2008/0111309 A1 | 5/2008 | Nicely et al. |
| 2008/0113704 A1 | 5/2008 | Jackson |
| 2008/0167105 A1 | 7/2008 | Kaminkow |
| 2009/0104962 A1 | 4/2009 | Nicely et al. |
| 2009/0104978 A1 | 4/2009 | Ben-Ami |
| 2009/0117959 A1 | 5/2009 | Nicely |
| 2009/0121434 A1 | 5/2009 | Baerlocher et al. |
| 2009/0124316 A1 | 5/2009 | Baerlocher et al. |
| 2010/0004051 A1 | 1/2010 | Walker et al. |
| 2010/0035676 A1 | 2/2010 | Nicely et al. |
| 2010/0120484 A1 | 5/2010 | Caputo et al. |
| 2011/0130192 A1 | 6/2011 | Englman et al. |

* cited by examiner

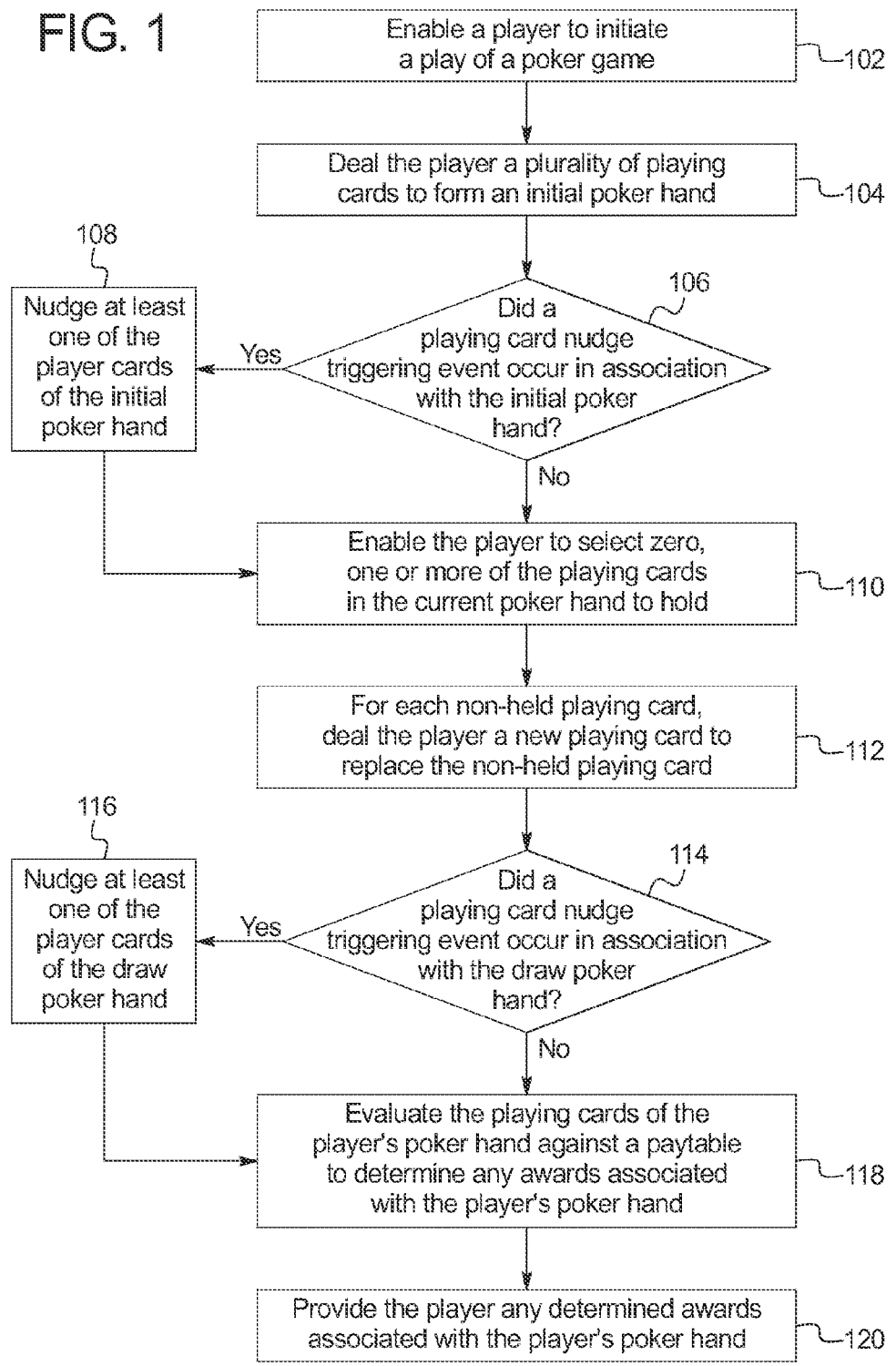

FIG. 2A
| ROYAL FLUSH | 750 | 1000 | 4000 |
| STRAIGHT FLUSH | 150 | 200 | 250 |
| 4 ACES | 240 | 320 | 400 |
| 4 2s, 3s, 4s | 120 | 160 | 200 |
| 4 5s THRU KINGS | 75 | 100 | 125 |
| FULL HOUSE | 24 | 32 | 40 |
| FLUSH | 15 | 20 | 25 |
| STRAIGHT | 12 | 16 | 20 |
| 3 OF A KIND | 9 | 12 | 15 |
| TWO PAIR | 6 | 8 | 10 |
| JACKS OR BETTER | 3 | 4 | 5 |
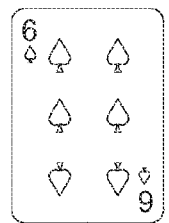 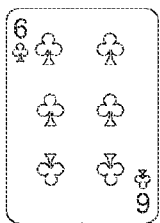 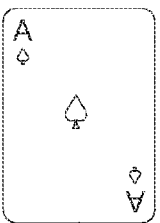 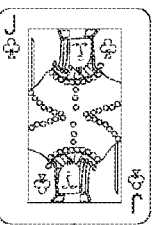 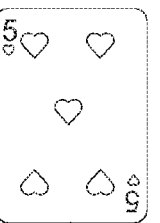
202a  202b  202c  202d  202e
Award
DRAW    0
204     208

FIG. 2B
| | | | 1116, 1118 |
| | | | 206 |
|---|---|---|---|
| ROYAL FLUSH | 750 | 1000 | 4000 |
| STRAIGHT FLUSH | 150 | 200 | 250 |
| 4 ACES | 240 | 320 | 400 |
| 4 2s, 3s, 4s | 120 | 160 | 200 |
| 4 5s THRU KINGS | 75 | 100 | 125 |
| FULL HOUSE | 24 | 32 | 40 |
| FLUSH | 15 | 20 | 25 |
| STRAIGHT | 12 | 16 | 20 |
| 3 OF A KIND | 9 | 12 | 15 |
| TWO PAIR | 6 | 8 | 10 |
| JACKS OR BETTER | 3 | 4 | 5 |
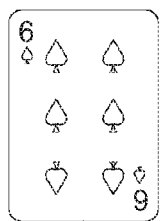
202a
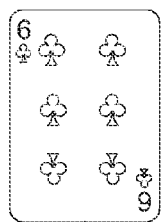
202b
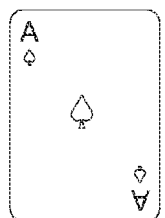
202c
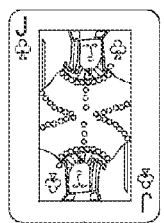
202d
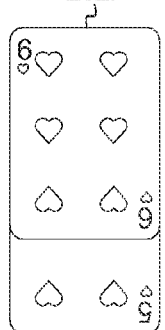
202e, 202f
YOUR DEALT PLAYING CARDS WERE SO CLOSE TO BEING A WINNING POKER HAND
LET'S NUDGE THAT FIVE OF HEARTS TO A SIX OF HEARTS AND CHANGE YOUR DEALT POKER HAND TO A WINNING POKER HAND
DRAW
204
Award
0
208

| ROYAL FLUSH | 750 | 1000 | 4000 |
| STRAIGHT FLUSH | 150 | 200 | 250 |
| 4 ACES | 240 | 320 | 400 |
| 4 2s, 3s, 4s | 120 | 160 | 200 |
| 4 5s THRU KINGS | 75 | 100 | 125 |
| FULL HOUSE | 24 | 32 | 40 |
| FLUSH | 15 | 20 | 25 |
| STRAIGHT | 12 | 16 | 20 |
| 3 OF A KIND | 9 | 12 | 15 |
| TWO PAIR | 6 | 8 | 10 |
| JACKS OR BETTER | 3 | 4 | 5 |

NOW THAT WE HAVE NUDGED A PLAYING CARD TO CHANGE YOUR DEALT POKER HAND TO A WINNING POKER HAND, PLEASE SELECT WHICH PLAYING CARDS YOU WANT TO HOLD FOR THE DRAW

DRAW

Award
0

FIG. 2D
| | | | |
|---|---|---|---|
| ROYAL FLUSH | 750 | 1000 | 4000 |
| STRAIGHT FLUSH | 150 | 200 | 250 |
| 4 ACES | 240 | 320 | 400 |
| 4 2s, 3s, 4s | 120 | 160 | 200 |
| 4 5s THRU KINGS | 75 | 100 | 125 |
| FULL HOUSE | 24 | 32 | 40 |
| FLUSH | 15 | 20 | 25 |
| STRAIGHT | 12 | 16 | 20 |
| 3 OF A KIND | 9 | 12 | 15 |
| TWO PAIR | 6 | 8 | 10 |
| JACKS OR BETTER | 3 | 4 | 5 |
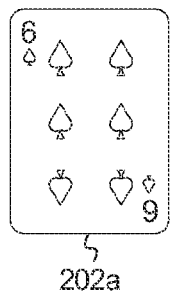 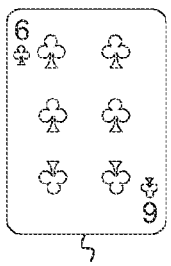 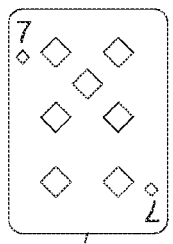 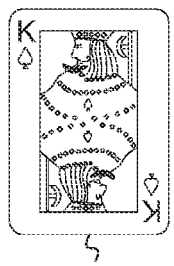 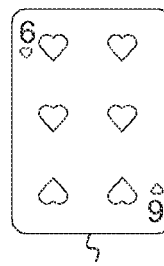
202a  202b  202g  202h  202f
AFTER THE DRAW, YOUR POKER HAND IS A
THREE-OF-A-KIND WINNING POKER HAND
BUT WAIT...
Award
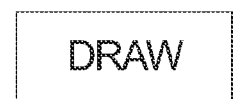 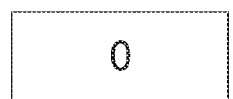
DRAW    0
204    208

FIG. 2E
| | | 206 | |
|---|---|---|---|
| ROYAL FLUSH | 750 | 1000 | 4000 |
| STRAIGHT FLUSH | 150 | 200 | 250 |
| 4 ACES | 240 | 320 | 400 |
| 4 2s, 3s, 4s | 120 | 160 | 200 |
| 4 5s THRU KINGS | 75 | 100 | 125 |
| FULL HOUSE | 24 | 32 | 40 |
| FLUSH | 15 | 20 | 25 |
| STRAIGHT | 12 | 16 | 20 |
| 3 OF A KIND | 9 | 12 | 15 |
| TWO PAIR | 6 | 8 | 10 |
| JACKS OR BETTER | 3 | 4 | 5 |
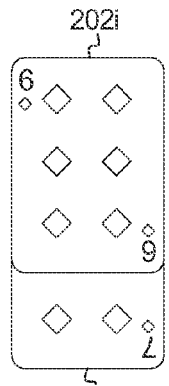
202i
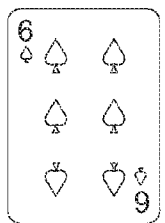 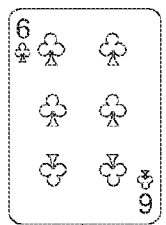 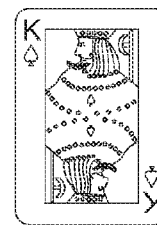 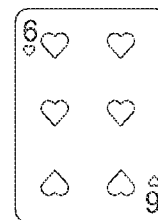
202a    202b    202g    202h    202f
HERE COMES ANOTHER NUDGE
Award
DRAW     0
204     208
1116, 1118

FIG. 2F
| ROYAL FLUSH | 750 | 1000 | 4000 |
| STRAIGHT FLUSH | 150 | 200 | 250 |
| 4 ACES | 240 | 320 | 400 |
| 4 2s, 3s, 4s | 120 | 160 | 200 |
| 4 5s THRU KINGS | 75 | 100 | 125 |
| FULL HOUSE | 24 | 32 | 40 |
| FLUSH | 15 | 20 | 25 |
| STRAIGHT | 12 | 16 | 20 |
| 3 OF A KIND | 9 | 12 | 15 |
| TWO PAIR | 6 | 8 | 10 |
| JACKS OR BETTER | 3 | 4 | 5 |
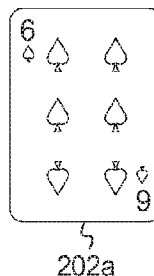
202a
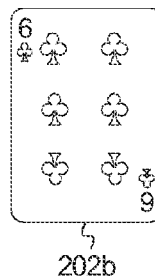
202b
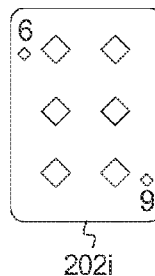
202i
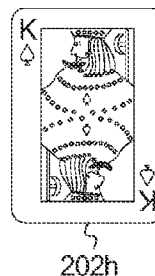
202h
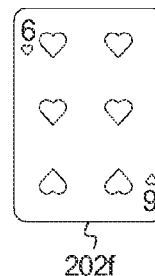
202f
THE SECOND NUDGE CAUSED YOUR
WINNING POKER HAND TO CHANGE TO
AN EVEN BETTER WINNING POKER HAND
YOUR AWARD FOR THIS EVEN BETTER
WINNING POKER HAND IS 125 CREDITS
DRAW    Award
         125
204      208

GAMING SYSTEM AND METHOD FOR PROVIDING A NUDGE POKER GAME

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

One such game employed by gaming machines is a reel slot game. Such a gaming machine includes a plurality of reels that each include a plurality of reel symbols. These gaming machines enable a player to place a wager on one or more paylines associated with a plurality of reel symbol positions. For each of the reels, certain of the reel symbols on that reel are generated independently from the reel symbols on each of the other reels to provide a combination of reel symbols. If a winning combination of reel symbols is generated and displayed along a wagered-on payline, the gaming machine provides an award for that payline. If a losing combination of reel symbols is generated and displayed along a wagered-on payline, the gaming machine provides no award for that payline. Certain such gaming machines are known to nudge or move one or more of the reels one or more reel stop positions to modify the generated combination of reel symbols It should be appreciated that certain of these gaming machines nudge or move one or more of the reels one or more reel stop positions regardless of which combination of reel symbols the gaming machine generated. That is, if the gaming machine nudges or moves one or more of the reels one or more reel stop positions, the gaming machine may modify: (i) the generated combination of reel symbols from a losing combination of reel symbols to a winning combination of reel symbols, or (ii) the generated combination of reel symbols from a winning combination of reel symbols to a losing combination of reel symbols. Modifying such generated reel symbols provides excitement and enjoyment for certain players.

Another such game employed by gaming machines is a poker game. In one form of a poker game, the gaming machine initially deals a quantity of cards, such as five cards, all face up from a virtual deck of fifty-two cards to form an initial poker hand. After the player is provided the initial poker hand, the gaming machine enables the player to select one or more of the initially dealt playing cards to discard. For each playing card the player selected to discard, the gaming machine replaces that playing card with another playing card from the deck of cards. The initially held playing cards and any subsequently dealt replacement cards form a subsequent or final poker hand. After this replacement, the gaming machine evaluates the playing cards of the subsequent or final poker hand to determine if the subsequent or final poker hand is a winning poker hand. The gaming machine then provides the player an award based on any winning poker hand.

In another form, the poker game includes multiple hands of poker played simultaneously. In this poker game, the gaming machine deals the player at least two hands of cards. The player chooses the cards to hold in a primary hand and the gaming machine holds such held cards in the primary hand and the other hands of cards. The gaming machines removes the remaining non-held cards from each hand displayed. For each hand, the gaming machine randomly deals replacement cards into that hand. Since the replacement cards are randomly dealt independently for each hand, the replacement cards for each hand may be different. After this replacement, for each hand, the gaming machine evaluates the cards for winning poker hands and provides any awards associated with any winning poker hands. Gaming machine which employ poker games provide excitement and enjoyment for certain players. Accordingly, a continuing need exists to enable players to play new and different poker games.

SUMMARY

The present disclosure relates generally to gaming systems and methods for providing a poker game that employs a modification feature, such as a nudge feature.

In various embodiments, the gaming system enables a player to play a poker game wherein during the play of the poker game, the gaming system determines if a playing card nudge triggering event occurs. In one embodiment, a playing card nudge triggering event may occur in association with the initially dealt hand of playing cards (i.e., the playing card nudge triggering event occurs before replacing any playing cards from the initially dealt poker hand). In other embodiments, the playing card nudge triggering event may additionally or alternatively occur in association with the drawn hand of playing cards (i.e., the playing card nudge triggering event occurs after replacing any playing cards from the initially dealt poker hand). In these embodiments, upon the determination that a playing card nudge triggering event occurs during a play of a poker game, the gaming system modifies, such as nudges, one or more of the player cards of the current poker hand.

In certain embodiments, the gaming system nudges such player cards by changing the rank of such playing cards by a quantity of ranks (e.g., a four of clubs playing card is nudged up one rank to a five of clubs playing card). In certain embodiments, the gaming system nudges such player cards by changing the suit of such playing cards by a quantity of suits (e.g., a four of clubs playing card is nudged one suit to a four of diamonds playing card). In certain embodiments, the gaming system nudges such player cards by changing the rank and the suit of such playing cards by a quantity of ranks and a quantity of suits (e.g., a four of clubs playing card is nudged up one rank and one suit to a five of diamonds playing card). It should be appreciated that in these embodiments, rather than selecting the next playing card in the deck of playing cards as a nudge playing card, the gaming system evaluates one or more of the playing cards in the player's poker hand and determines, based on these evaluated playing cards, which playing card(s) to utilize as the nudge playing card(s).

In one embodiment, if the playing card nudge triggering event occurred in association with the dealt hand of playing cards, then following such nudging of any playing cards of the initially dealt poker hand, the gaming system proceeds with enabling the player to select which playing cards to discard. In this embodiment, in addition to enabling the player to discard the non-nudged dealt playing cards, the gaming system enables the player to discard any nudged playing card(s). Following such discard, the gaming system deals a replacement playing card for each discarded playing card to form a draw poker hand of playing cards. The gaming system then determines if any awards are associated with the formed draw poker hand and provides any associated awards to the player. It should be appreciated that in this embodiment, if one of the initially dealt playing cards which the player planned to hold is subsequently nudged, this nudge may alter not only the player's decision regarding which playing cards to hold/discard but may also alter the player's formed draw poker hand (and thus which award, if any, the gaming system provides to the player).

In another embodiment, if the playing card nudge triggering event occurred in association with the draw hand of playing cards, then following such nudging of any playing cards of the draw poker hand, the gaming system proceeds with determining if any awards are associated with the current poker hand. It should be appreciated that in this embodiment, if one of the replacement playing cards or held playing cards is subsequently nudged, the player's formed draw poker hand (and thus which award, if any, the gaming system provides to the player) is based on the nudge playing card.

Accordingly, these embodiments provide that one or more playing card modification features, such as one or more playing card nudges, affect the player's poker hand and thus affect the poker hand award ultimately provided to the player. Such modifications increase the level of excitement and enjoyment for certain players.

Additional features and advantages are described in, and will be apparent from, the following Detailed Description and the figures.

BRIEF DESCRIPTION OF THE FIGURES

FIG. 1 is a flow chart an example process for operating a gaming system providing one embodiment of the poker game disclosed herein.

FIGS. 2A, 2B, 2C, 2D, 2E and 2F are front views of one embodiment of the gaming system disclosed herein illustrating a play of a poker game which employs a nudge feature.

DETAILED DESCRIPTION

Nudge Poker Game

Figure 2C:
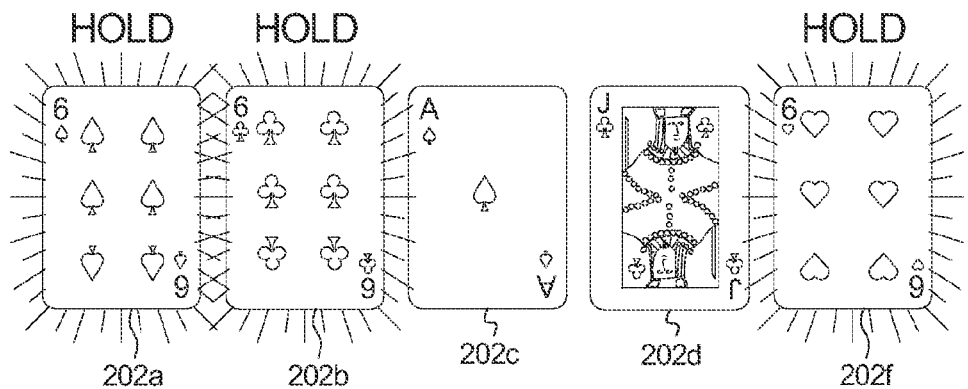

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, the gaming system enables a player to initiate a play of a poker game as indicated in block 102 of FIG. 1. In one embodiment, the poker game is a primary game or base game wherein the player places a primary poker game wager to play the poker game. In another embodiment, the poker game is a secondary or bonus game which is initiated upon an occurrence of a secondary game triggering event.

Following the initiation of the poker game, the gaming system deals, selects or provides the player a plurality of playing cards as indicated in block 104. The playing cards dealt to the player form an initial poker hand. For example, as seen in FIG. 2A, the gaming system deals the player an initial poker hand including: the six of spades playing card 202a, the six of clubs playing card 202b, the ace of spades playing card 202c, the jack of clubs playing card, 202d and the five of hearts playing card 202e.

In one embodiment, the gaming system deals the playing cards from a single fifty-two card deck. In another embodiment, the gaming system deals the playing cards from a plurality of fifty-two card decks. In another embodiment, the gaming system selects the playing cards from a predetermined set of cards. In another embodiment, the gaming system selects the playing cards from a deck of more than fifty-two playing cards, such as a deck including one or more "joker" or wild playing cards. In this embodiment, a joker or wild playing card may substitute for any other playing card.

In one embodiment, after the gaming system deals an initial poker hand to the player, the gaming system determines if a playing card nudge triggering event occurred in association with the initial poker hand as indicated in diamond 106. In one embodiment, a playing card nudge triggering event occurs based on a displayed event associated with the play of a poker game. In another such embodiment, a playing card nudge triggering event occurs based on an event independent of any displayed event associated with the play of the poker game.

If the gaming system determines that a playing card nudge triggering event occurred, as indicated in block 108, the gaming system nudges at least one of the player cards of the initial poker hand.

In one embodiment, the gaming system nudges such player cards by changing the rank of such playing cards by a quantity of ranks. For example, as seen in FIG. 2B, upon the occurrence of a playing card nudge triggering event, the gaming system selects the five of hearts playing card and nudges the selected five of hearts playing card 202e to a six of hearts playing card 202f. It should be appreciated that in this example, rather than selecting the next playing card in the deck of playing cards as a nudge playing card and changing the five of hearts playing card to that selected nudge playing card, the gaming system evaluated the player's poker hand to determine that the player's poker hand already included two playing cards with the rank of six. Based on this evaluation and the playing cards remaining in the deck of playing cards, the gaming system of this example determined to utilize the six of hearts as the nudge playing card and thus nudged the five of hearts playing card 202e to the six of hearts playing card 202f.

As further seen in FIG. 2B, since the player's dealt poker hand already included a pair of sixes, this nudge caused the player's dealt poker hand to include three sixes. Accordingly, the nudge of the single playing card changed or modified the player's dealt poker hand from a losing poker hand to a winning poker hand. In this example, the gaming system displays appropriate messages such as "YOUR DEALT PLAYING CARDS WERE SO CLOSE TO BEING A WINNING POKER HAND" and "LET'S NUDGE THAT FIVE OF HEARTS TO A SIX OF HEARTS AND CHANGE YOUR DEALT POKER HAND TO A WINNING POKER HAND" to the player visually, or through suitable audio or audiovisual displays.

Following the nudge of one or more playing cards or the determination that no playing card nudge triggering event occurred, the gaming system enables the player to select zero, one or more of the playing cards in the current poker hand to hold as indicated in block 110. For example, as seen in FIG. 2C, the player indicated to hold the six of spades playing card 202a, the six of clubs playing card 202b and the six of hearts playing card 202f (which resulted from the above-described nudge). In this example, the gaming system displays appropriate messages such as "NOW THAT WE HAVE NUDGED A PLAYING CARD TO CHANGE YOUR DEALT POKER HAND TO A WINNING POKER HAND, PLEASE SELECT WHICH PLAYING CARDS YOU WANT TO HOLD FOR THE DRAW" to the player visually, or through suitable audio or audiovisual displays.

After enabling the player to indicate which playing cards to hold, for each non-held or discarded playing card, the gaming system provides or deals the player a new playing card to replace the non-held or discarded playing card as indicated in block 112 of FIG. 1. The held playing cards and any replacement playing cards form a draw poker hand. For example, as seen in FIG. 2D, utilizing draw button 204 to initiate the drawn, the gaming system replaced: (i) the ace of spades playing card 202c with the seven of diamonds playing card 202g, and (ii) the jack of clubs playing card 202d with the king of spades 202h playing cards. In this example, the gaming system displays appropriate messages such as "AFTER THE DRAW, YOUR POKER HAND IS A THREE-OF-A-KIND WINNING POKER HAND" and "BUT WAIT . . . " to the player visually, or through suitable audio or audiovisual displays.

After the gaming system replaces each non-held playing card with a replacement card, the gaming system determines if a playing card nudge triggering event occurred in association with the draw poker hand as indicated in diamond 114 of FIG. 1. In one embodiment, as mentioned above, a playing card nudge triggering event occurs based on a displayed event associated with the play of a poker game. In another embodiment, as also mentioned above, a playing card nudge triggering event occurs based on an event independent of any displayed event associated with the play of the poker game.

If the gaming system determines that a playing card nudge triggering event occurred, as indicated in block 116, the gaming system nudges at least one of the playing cards of the draw poker hand. In this embodiment, as described above, the gaming system nudges one or more of the playing cards one or more playing card ranks. Any non-nudged held playing cards, any non-nudged replacement playing cards and any nudged playing cards form a final poker hand. For example, as seen in FIG. 2E, the gaming system nudged the seven of diamonds playing card to a six of diamonds playing card 202i. It should be appreciated that in this example, rather than selecting the next playing card in the deck of playing cards as a nudge playing card and changing the seven of diamonds playing card to that selected nudge playing card, the gaming system evaluated the player's poker hand to determine that the player's poker hand already included three playing cards with the rank of six. Based on this evaluation and the playing cards remaining in the deck of playing cards, the gaming system of this example determined to utilize the six of diamonds as the nudge playing card and thus nudged the seven of diamonds playing card 202g to the six of diamonds playing card 202i. In this example, the gaming system displays appropriate messages such as "HERE COMES ANOTHER NUDGE" to the player visually, or through suitable audio or audiovisual displays.

Following the nudge of one or more playing cards or the determination that no playing card nudge triggering event occurred, the gaming system evaluates the playing cards of the player's poker hand against a paytable to determine any awards associated with the player's poker hand as indicated in block 118 of FIG. 1. The gaming system then provides the player any determined awards associated with the player's poker hand as indicated in block 120. For example, as seen in FIG. 2F, the gaming system utilizes poker paytable 206 to determine that the player's poker hand of four-of-a-kind (i.e., four playing cards each having the same rank of six) is a winning poker hand associated with an award of one-hundred-twenty-five (indicated in award meter 208) which the gaming system provides to the player. In this example, the gaming system displays appropriate messages such as "THE SECOND NUDGE CAUSED YOUR WINNING POKER HAND TO CHANGE TO AN EVEN BETTER WINNING POKER HAND" and "YOUR AWARD FOR THIS EVEN BETTER WINNING POKER HAND IS 125 CREDITS" to the player visually, or through suitable audio or audiovisual displays.

In one embodiment wherein the poker game disclosed herein is implemented as a primary game, in addition to placing a primary poker game wager to play the poker game, the gaming system requires the player to place an additional wager or side wager to activate the playing card nudge feature described below. In different embodiments, the additional wager or side wager is one or more of: an amount of monetary credits, an amount of non-monetary credits, an amount of promotional credits and/or an amount of playing tracking points. In another embodiment wherein the poker game disclosed herein is implemented as a primary game, the gaming system does not require any additional or side wager and activates the playing card nudge feature in association with the placement of the primary poker game wager. In another embodiment wherein the poker game disclosed herein is implemented as a primary game, upon the player placing the primary poker game wager, the gaming system determines if the placed primary poker game wager is at least equal to a threshold amount. In this embodiment, if the placed primary poker game wager is at least equal to the threshold amount, the gaming system activates the playing card nudge feature in association with the placement of the primary poker game wager. On the other hand, if the placed primary poker game wager is less than the threshold amount, the gaming system does not activate the playing card nudge feature in association with the placement of the primary poker game wager.

In one embodiment, as described above, a playing card nudge triggering event may occur in association with a deal poker hand and also in association with a draw poker hand. In another embodiment, a playing card nudge triggering event may occur in association with a deal poker hand (but not in association with a draw poker hand). In this embodiment, the process of FIG. 1 proceeds from block 112 directly to block 118. In another embodiment, a playing card nudge triggering event may occur in association with a draw poker hand (but not in association with a deal poker hand). In this embodiment, the process of FIG. 1 proceeds from block 104 directly to block 110.

In another embodiment, as mentioned above, a playing card nudge triggering event occurs, based on an outcome associated with one or more plays of any primary game and/or an outcome associated with one or more plays of any secondary games. In one embodiment, such determinations are symbol driven or playing card drive based on the generation of one or more designated symbols, designated symbol combinations, designated playing cards or designated playing card combinations.

In another embodiment, as also mentioned above, the gaming system does not provide any apparent reasons to the players for a playing card nudge triggering event to occur. In these embodiments, such determinations are not triggered by an event in a primary game or based specifically on any of the plays of any primary game or on any of the plays of any secondary game. That is, these events occur without any explanation or alternatively with simple explanations.

In one embodiment, a playing card nudge triggering event occurs, based on an amount coin-in. In this embodiment, the gaming system determines if an amount of coin-in wagered reaches or exceeds a designated amount of coin-in (i.e., a threshold coin-in amount). Upon the amount of coin-in wagered reaching or exceeding the bonus threshold coin-in amount, the gaming system causes such a triggering event to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination separate from the central controller, determined based on one or more side wagers placed, determined based on the player's primary game wager, determined based on time (such as the time of day) or determined based on any other suitable method or criteria.

In another alternative embodiment, a playing card nudge triggering event occurs, based on an amount coin-out. In this embodiment, the gaming system determines if an amount of coin-out provided reaches or exceeds a designated amount of coin-out (i.e., a threshold coin-out amount). Upon the amount of coin-out provided reaching or exceeding the threshold coin-out amount, the gaming system causes such a triggering event to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination separate from the central controller, determined based on one or more side wagers placed, determined based on the player's primary game wager, determined based on time (such as the time of day) or determined based on any other suitable method or criteria.

In another alternative embodiment, a playing card nudge triggering event occurs, based on a predefined variable reaching a defined parameter threshold. For example, when the 500,000$^{th}$ player has played a game or played at the gaming system (ascertained from a player tracking system), the gaming system causes such a triggering event to occur. In different embodiments, the predefined parameter thresholds include a length of time, a length of time after a certain dollar amount is hit, a wager level threshold for a specific device (which device is the first to contribute $250,000), a number of devices active, or any other parameter that defines a suitable threshold.

In another alternative embodiment, a playing card nudge triggering event occurs, based on a quantity of games played. In this embodiment, a quantity of games played is set for when such a triggering event will occur. In one embodiment, such a set quantity of games played is based on historic data.

In another alternative embodiment, a playing card nudge triggering event occurs, based on time. In this embodiment, a time is set for when such a triggering event will occur. In one embodiment, such a set time is based on historic data.

In another alternative embodiment, a playing card nudge triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card. The gaming system determines the player tracking level of the player and if the current player tracking level defined by the gaming system operator is eligible for such a triggering event. In one embodiment, the gaming system operator defines minimum bet levels required for such a triggering event to occur based on the player's card level.

In another alternative embodiment, a playing card nudge triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to such a triggering event will occur. In one such embodiment, the player who consistently places a higher wager is more likely to be associated with an occurrence of such a triggering event than a player who consistently places a minimum wager. It should be appreciated that the criteria for determining whether a player is in active status or inactive status for determining if such a triggering event will occur may the same as, substantially the same as, or different than the criteria for determining whether a player is in active status or inactive status for another events to occur.

In another alternative embodiment, a playing card nudge triggering event occurs, based on a determination of if any numbers allotted to the gaming system match a randomly selected number. In this embodiment, upon or prior to each play of each game, the gaming system selects a random number from a range of numbers and during each primary game, the gaming system allocates the first N numbers in the range, where N is the number of credits bet by the player in that primary game. At the end of the primary game, the randomly selected number is compared with the numbers allocated to the player and if a match occurs, such a triggering event occurs.

It should be appreciated that any suitable manner of causing a playing card nudge triggering event to occur may be implemented in accordance with the gaming system and method disclosed herein. It should be further appreciated that any of the above-described playing card nudge triggering events may be combined in one or more different embodiments.

In one embodiment, the gaming system selects which playing card(s) to nudge based on the playing cards of the player's current poker hand. In one such embodiment, if the gaming system determines that a nudge of a specific dealt card increases the player's award amount, the gaming system selects that playing card to nudge. For example, if the gaming system determines that nudging a dealt playing card increases the final poker hand from a two pair poker hand associated with one award amount to a three-of-a-kind poker hand associated with a second, greater award amount, the gaming system nudges that playing card. In another such embodiment, if the gaming system determines that a nudge of a specific dealt card increases the player's probability of obtaining a winning poker hand, the gaming system selects that playing card to nudge.

In an alternative embodiment, the gaming system nudges such player cards by changing the suit of such playing cards by a quantity of suits. In this embodiment, the gaming system assigns a number or ranking to each suit and nudges such playing cards by nudging the suit of these playing cards. For example (not shown), if the gaming system assigns the number one of the clubs suit, the number two to the diamonds suit, the number three to the hearts suit and the number four to the spades suit, upon an occurrence of a playing card nudge trigging event, the gaming system nudges a five of hearts playing card to a five of spades playing card.

In another embodiment, the gaming system nudges such player cards by changing the rank and the suit of such playing cards by a quantity of ranks and a quantity of suits. It should be appreciated that the gaming system disclosed herein is configured to nudge one or more playing cards by one or more ranks and/or one or more suits in one or more nudge directions. For example, for a single poker hand, the gaming system is configured to: (i) nudge a first dealt playing card down three ranks from a rank of seven to a rank of four, (ii) nudge a second dealt playing card up two ranks from a rank of three to a rank of five, and (iii) nudge a third dealt playing card down one suit from a suit of diamonds to a suit of clubs.

In one alternative embodiment, rather than automatically nudging one or more playing cards upon the occurrence of a playing card nudge triggering event, the gaming system enables the player to select whether they want to enable one or more playing cards to be nudged. In another embodiment, rather than automatically nudging one or more playing cards upon the occurrence of a playing card nudge triggering event, the gaming system enables the player to select whether they want one or more playing cards nudged based on a rank of such playing cards and/or a suit of such playing cards. In another embodiment, rather than automatically nudging one or more playing cards upon the occurrence of a playing card nudge triggering event, the gaming system enables the player to select a nudge direction for one or more playing cards.

In another embodiment, the gaming system selects which playing card(s) to nudge based on which player cards are displayed in which playing card positions. In one such embodiment, if the gaming system determines that a nudge of a specific dealt card displayed in a specific playing card position increases the player's award amount, the gaming system selects that playing card to nudge. In another such embodiment, if the gaming system determines that a nudge of a specific dealt card displayed in a specific playing card position increases the player's probability of obtaining a winning poker hand, the gaming system selects that playing card to nudge.

In one embodiment in which the gaming system selects the playing cards from a single deck of playing cards, if two playing cards in the poker hand are both capable of being nudged to the same rank/suit of a playing card, the gaming system is prohibited from nudging both of such playing cards. That is, in this embodiment, the gaming system will not nudge multiple playing cards so that a poker hand dealt from a single deck of playing cards includes duplicate playing cards. In another embodiment in which the gaming system selects the playing cards from a plurality of decks of playing cards, if two playing cards in the poker hand are both capable of being nudged to the same rank/suit of a playing card, the gaming system nudges both of such playing cards such that the poker hand dealt from a plurality of decks includes duplicate playing cards.

In one embodiment, as described above, the second poker hand provided after the first draw (and any subsequent nudging of any playing cards) is the final poker hand for the poker game. In another embodiment, at least one additional draw will occur and the second poker hand is not final poker hands but rather is an intermediate poker hand. For example, if the poker game includes a second draw, then the provided third poker hand would be considered the final poker hand.

In another embodiment, the gaming system employs the above-described nudge feature in association with a poker game including multiple hands of poker played simultaneously. In this embodiment, the playing card nudge triggering event may occur (and cause a nudge or modification to one or more playing cards) in association with the player's primary hand and/or in association with any of the other, simultaneously played poker hands. In other embodiments, in addition to providing a five card draw poker game with a nudging feature as described above, the present disclosure may be employed with other suitable types of poker games, such as Texas Hold'em, as well as other suitable non-poker interactive cards games, such as blackjack. Any suitable interactive card game which includes a nudging of one or more playing cards may thus be implemented in accordance with the present disclosure.

Alternative Embodiments

It should be appreciated that in different embodiments, one or more of:
  i. when a playing card nudge triggering event occurs;
  ii. a quantity of playing cards to be nudged;
  iii. a quantity of playing card positions to nudge the playing cards of such positions;
  iv. a determination of which playing cards to nudge;

v. a determination of which playing card positions to nudge the playing cards of such positions;
vi. a direction to nudge each playing card selected to be nudged;
vii. a quantity of nudges applied to each playing card selected to be nudged;
viii. a determination of whether to nudge a playing card by rank;
ix. a determination of whether to nudge a playing card by suit;
x. a determination of whether to nudge a playing card by rank and suit;
xi. any determination disclosed herein;

is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
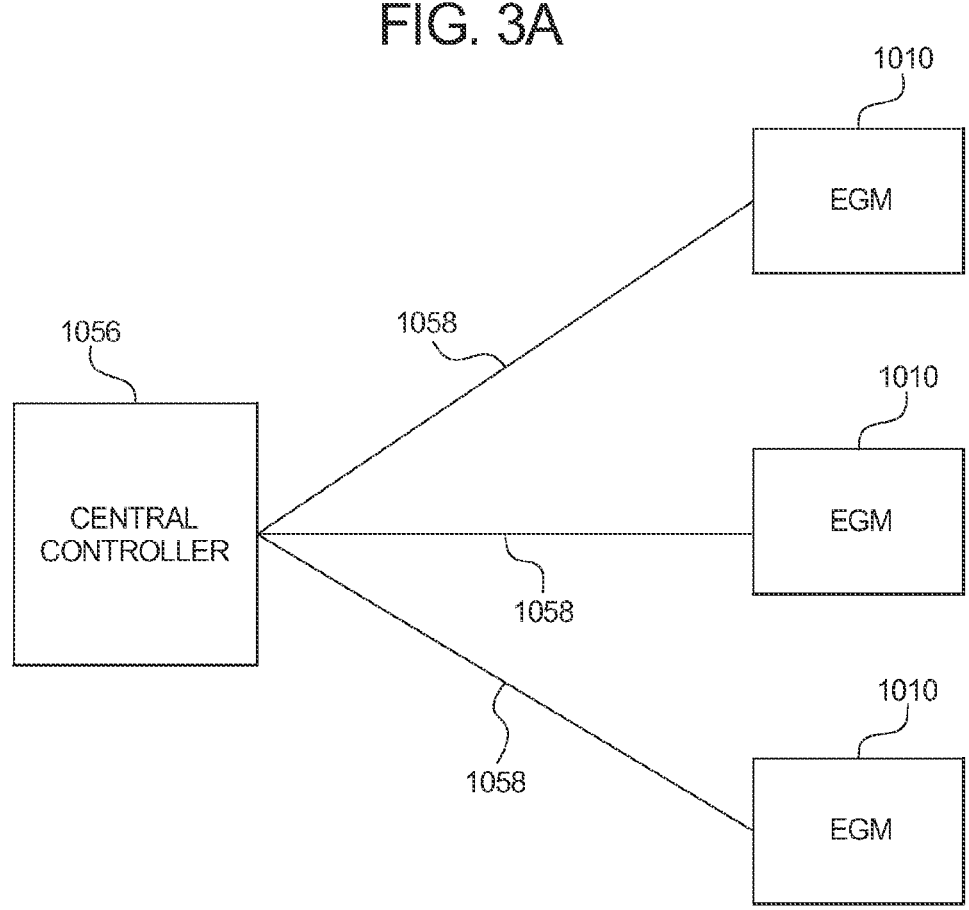
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
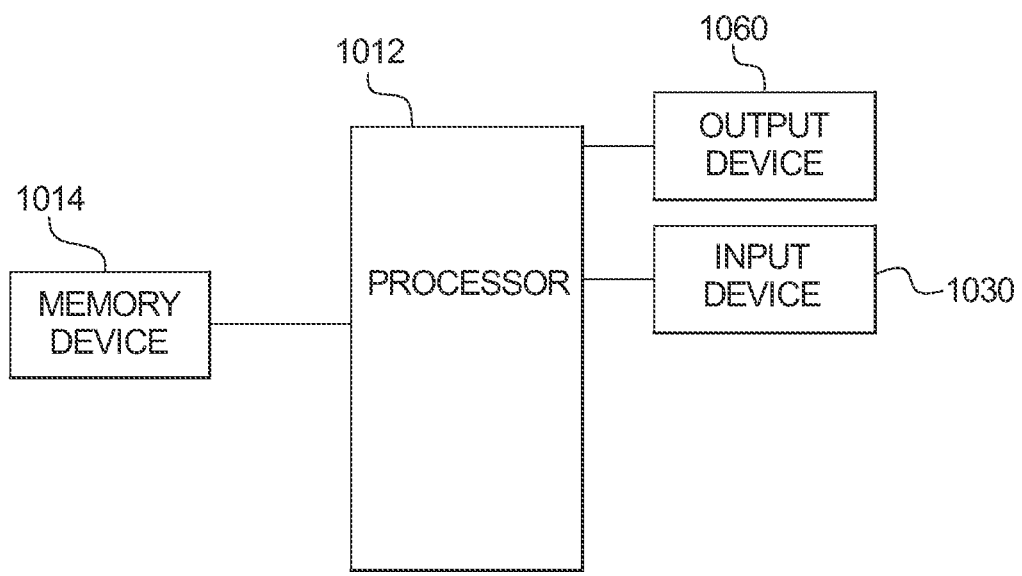
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
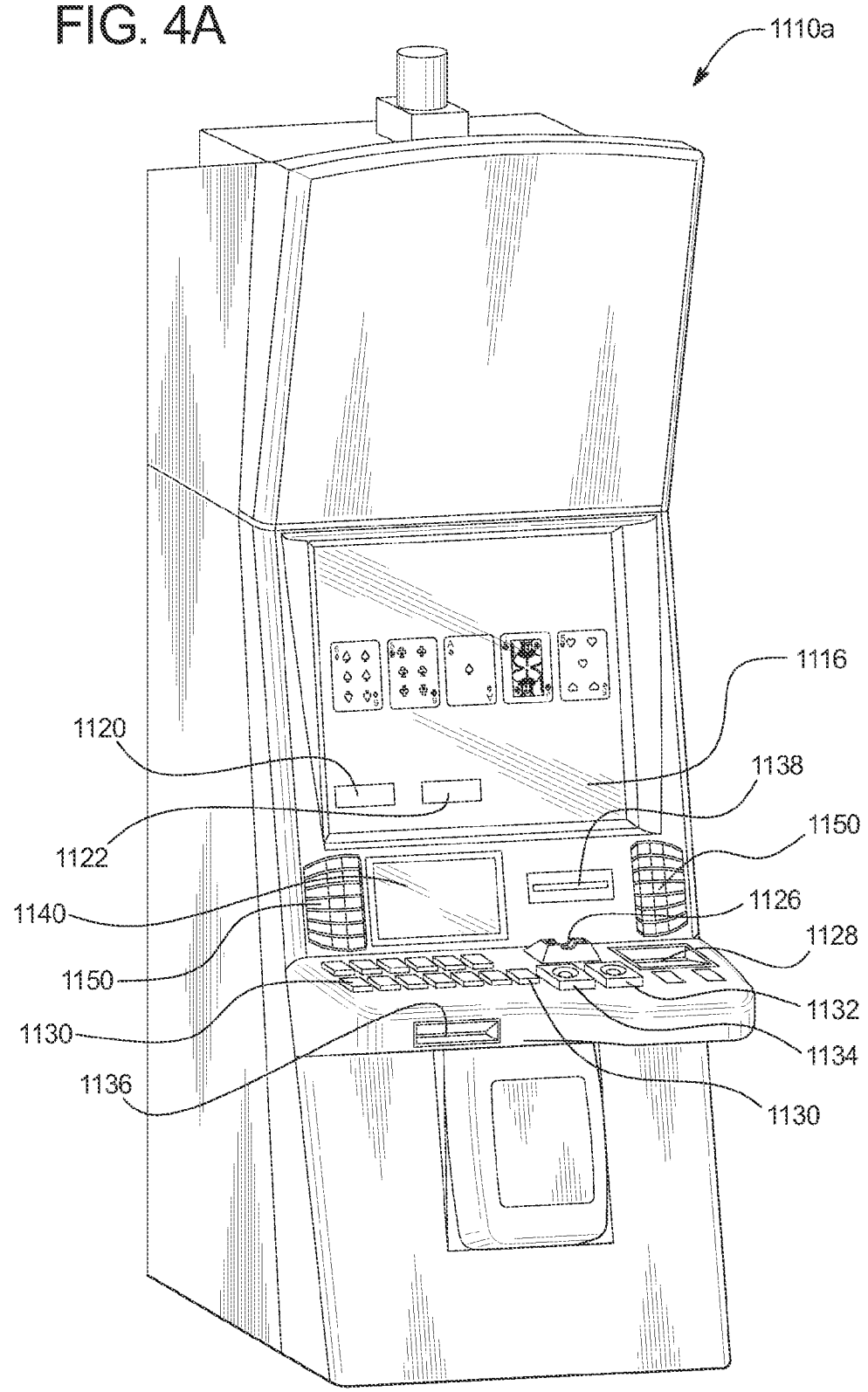
FIGS. 4A and 4B are perspective views of example alternative embodiments of the gaming system disclosed herein.
Figure 4B:
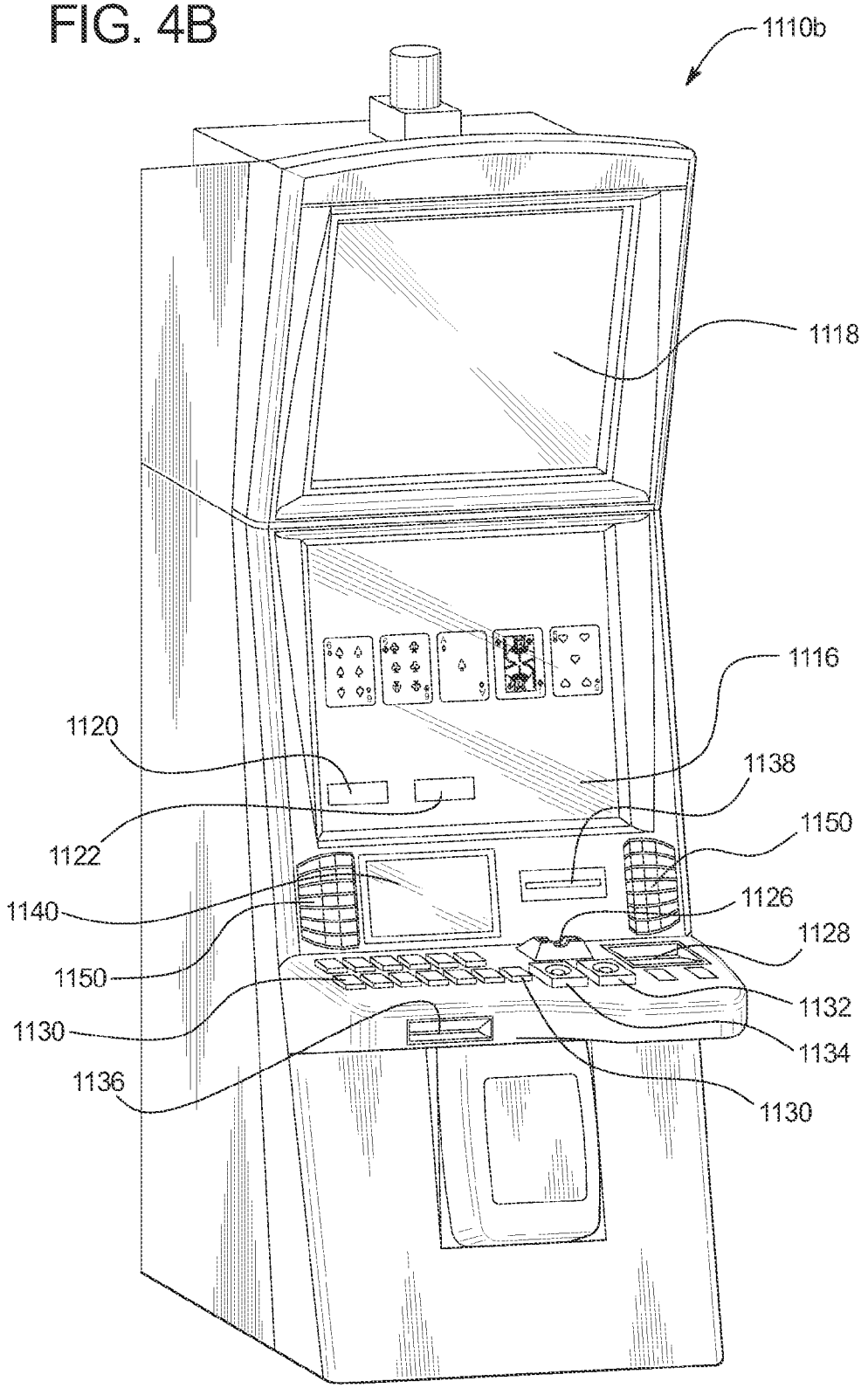

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) (if the poker game disclosed herein is implemented as a secondary game) and the secondary game(s) (if the poker game disclosed herein is implemented as a primary game) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the poker game disclosed herein is a bonus game, the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in certain embodiments wherein the poker game disclosed herein is a bonus game, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
 a housing;
 a plurality of input devices supported by the housing, said plurality of input devices including:
  (i) an acceptor, and
  (ii) a cashout device;
 at least one display device supported by the housing;
 at least one processor; and
 at least one memory device which stores a plurality of instructions, which when executed by the at least one processor, cause the at least one processor to operate with the at least one display device and the plurality of input devices to:
  (a) if a physical item is received via the acceptor, establish a credit balance based, at least in part, on a monetary value associated with the received physical item,
  (b) after establishing the credit balance based, at least in part, on the monetary value associated with the received physical item:
   (i) randomly select, via the at least one processor, a plurality of playing cards from a set of playing cards,
   (ii) display, via the at least one display device, a first poker hand including said randomly selected plurality of playing cards,
   (iii) if a playing card nudge triggering event occurs in association with the first poker hand:

(A) select, via the at least one processor, at least one of the playing cards of said first poker hand, and
(B) for each selected playing card:
(I) select, via the at least one processor, a nudge playing card from the set of playing cards, wherein said selection is based, at least in part, on the selected playing card, and
(II) display, via the at least one display device, the selected nudge playing card replacing said selected playing card in said first poker hand,
(iv) enable a designation of at least one of said playing cards in said first poker hand to be discarded,
(v) if at least one of said playing cards in said first poker hand is designated to be discarded, for each playing card designated to be discarded:
(A) randomly select, via the at least one processor, a replacement playing card from the set of playing cards,
(B) display, via the at least one display device, the randomly selected replacement playing card replacing the playing card in the first poker hand designated to be discarded, wherein any held playing cards, any selected nudge playing cards and any selected replacement playing cards form a second poker hand,
(C) determine, via the at least one processor, if the second poker hand is associated with any awards, and
(D) provide any awards associated with the second poker hand, wherein the credit balance is increasable based on any provided awards associated with the second poker hand,
(vi) if none of said playing cards in said first poker hand are designated to be discarded:
(A) determine, via the at least one processor, if the first poker hand is associated with any awards, and
(B) provide any awards associated with the first poker hand, wherein the credit balance is increasable based on any provided awards associated with the first poker hand, and
(c) if a cashout input is received via the cashout device, cause an initiation of any payout associated with the credit balance.

2. The gaming system of claim 1, wherein for each selected playing card, said selection of the nudge playing card is based on nudging said selected playing card by at least one rank.

3. The gaming system of claim 1, wherein for each selected playing card, said selection of the nudge playing card is based on nudging said selected playing card by at least one suit.

4. The gaming system of claim 1, wherein for each selected playing card, said selection of the nudge playing card is based on nudging said selected playing card by at least one rank and at least one suit.

5. The gaming system of claim 1, wherein if the playing card nudge triggering event occurs in association with the first poker hand, the selection of the nudge playing card is based, at least in part, on at least one of the non-selected playing cards of said first poker hand.

6. The gaming system of claim 1, wherein when executed by the at least one processor, if a playing card nudge triggering event occurs in association with the second poker hand, the plurality of instructions cause the at least one processor to:
select at least one of the playing cards of said second poker hand, and for each selected playing card:
(A) select a nudge playing card from the set of playing cards, wherein said selection is based, at least in part, on the selected playing card, and
(B) display the selected nudge playing card replacing said selected playing card in said second poker hand.

7. The gaming system of claim 6, wherein if the playing card nudge triggering event occurs in association with the second poker hand, the selection of the nudge playing card is based, at least in part, on at least one of the non-selected playing cards of said second poker hand.

8. The gaming system of claim 1, wherein when executed by the at least one processor, if a playing card nudge triggering event occurs in association with the first poker hand after none of said playing cards in said first poker hand are designated to be discarded, the plurality of instructions cause the at least one processor to:
select at least one of the playing cards of said first poker hand, and for each selected playing card:
(A) select a nudge playing card from the set of playing cards, wherein said selection is based, at least in part, on the selected playing card, and
(B) display the selected nudge playing card replacing said selected playing card in said first poker hand.

9. The gaming system of claim 8, wherein if the playing card nudge triggering event occurs in association with the first poker hand after none of said playing cards in said first poker hand are designated to be discarded, the selection of the nudge playing card is based, at least in part, on at least one of the non-selected playing cards of said first poker hand.

10. A gaming system comprising:
a housing;
a plurality of input devices supported by the housing, said plurality of input devices including:
(i) an acceptor, and
(ii) a cashout device;
at least one display device supported by the housing;
at least one processor; and
at least one memory device which stores a plurality of instructions, which when executed by the at least one processor, cause the at least one processor to operate with the at least one display device and the plurality of input device to:
(a) if a physical item is received via the acceptor, establish a credit balance based, at least in part, on a monetary value associated with the received physical item,
(b) after establishing the credit balance based, at least in part, on the monetary value associated with the received physical item:
(i) randomly select, via the at least one processor, a plurality of playing cards from a set of playing cards,
(ii) display, via the at least one display device, a first poker hand including said randomly selected plurality of playing cards,
(iii) enable a designation of at least one of said playing cards in said first poker hand to discard,
(iv) for each playing card designated to be discarded:
(A) randomly select, via the at least one processor, a replacement playing card from the set of playing cards, and (B) display, via the at least one display device, the randomly selected replacement playing card replacing the playing card in the first poker hand designated to be discarded, wherein any held playing cards, any selected nudge playing cards and any selected replacement playing cards form a second poker hand, (v) if a playing card nudge triggering event occurs in association with the second poker hand:
  (A) select, via the at least one processor, at least one of the playing cards of said second poker hand, and
  (B) for each selected playing card:
    (I) select, via the at least one processor, a nudge playing card from the set of playing cards, wherein said selection is based, at least in part, on the selected playing card, and
    (II) display, via the at least one display device, the selected nudge playing card replacing said selected playing card in said second poker hand, (vi) determine, via the at least one processor, if the second poker hand is associated with any awards, and (vii) provide any awards associated with the second poker hand, wherein the credit balance is increasable based on any provided awards associated with the first poker hand, and (c) if a cashout input is received via the cashout device, cause an initiation of any payout associated with the credit balance.

11. The gaming system of claim 10, wherein for each selected playing card, said selection of the nudge playing card is based on nudging said selected playing card by at least one rank.

12. The gaming system of claim 10, wherein for each selected playing card, said selection of the nudge playing card is based on nudging said selected playing card by at least one suit.

13. The gaming system of claim 10, wherein for each selected playing card, said selection of the nudge playing card is based on nudging said selected playing card by at least one rank and at least one suit.

14. The gaming system of claim 10, wherein if the playing card nudge triggering event occurs in association with the second poker hand, the selection of the nudge playing card is based, at least in part, on at least one of the non-selected playing cards of said second poker hand.

15. A method of operating a gaming system, said method comprising:
  (a) if a physical item is received via an acceptor, establishing a credit balance based, at least in part, on a monetary value associated with the received physical item;
  (b) after establishing the credit balance based, at least in part, on the monetary value associated with the received physical item:
    (i) causing at least one processor to execute a plurality of instructions to randomly select a plurality of playing cards from a set of playing cards,
    (ii) causing at least one display device to display a first poker hand including said randomly selected plurality of playing cards,
    (iii) if a playing card nudge triggering event occurs in association with the first poker hand:
      (A) causing the at least one processor to execute the plurality of instructions to select at least one of the playing cards of said first poker hand, and
      (B) for each selected playing card:
        (I) causing the at least one processor to execute the plurality of instructions to select a nudge playing card from the set of playing cards, wherein said selection is based, at least in part, on the selected playing card, and
        (II) causing the at least one display device to display the selected nudge playing card replacing said selected playing card in said first poker hand,
    (iv) enabling a designation of at least one of said playing cards in said first poker hand to be discarded,
    (v) if at least one of said playing cards in said first poker hand is designated to be discarded, for each playing card designated to be discarded:
      (A) causing the at least one processor to execute the plurality of instructions to randomly select a replacement playing card from the set of playing cards,
      (B) causing the at least one display device to display the randomly selected replacement playing card replacing the playing card in the first poker hand designated to be discarded, wherein any held playing cards, any selected nudge playing cards and any selected replacement playing cards form a second poker hand,
      (C) causing the at least one processor to execute the plurality of instructions to determine if the second poker hand is associated with any awards, and
      (D) providing any awards associated with the second poker hand, wherein the credit balance is increasable based on any awards associated with the second poker hand, and
    (vi) if none of said playing cards in said first poker hand are designated to be discarded:
      (i) causing the at least one processor to execute the plurality of instructions to determine if the first poker hand is associated with any awards, and
      (ii) providing any awards associated with the first poker hand, wherein the credit balance is increasable based on any awards associated with the first poker hand, and
  (c) if a cashout input is received via a cashout device, causing an initiation of a payout associated with the credit balance.

16. The method of claim 15, wherein for each selected playing card, said selection of the nudge playing card is based on nudging said selected playing card by at least one rank.

17. The method of claim 15, wherein for each selected playing card, said selection of the nudge playing card is based on nudging said selected playing card by at least one suit.

18. The method of claim 15, wherein for each selected playing card, said selection of the nudge playing card is based on nudging said selected playing card by at least one rank and at least one suit.

19. The method of claim 15, wherein if the playing card nudge triggering event occurs in association with the first poker hand, the selection of the nudge playing card is based, at least in part, on at least one of the non-selected playing cards of said first poker hand.

20. The method of claim 15, which includes, if a playing card nudge triggering event occurs in association with the second poker hand:

causing the at least one processor to execute the plurality of instructions to select at least one of the playing cards of said second poker hand, and for each selected playing card:
- (A) causing the at least one processor to execute the plurality of instructions to select a nudge playing card from the set of playing cards, wherein said selection is based, at least in part, on the selected playing card, and
- (B) causing the at least one display device to display the selected nudge playing card replacing said selected playing card in said second poker hand.

21. The method of claim 20, wherein if the playing card nudge triggering event occurs in association with the second poker hand, the selection of the nudge playing card is based, at least in part, on at least one of the non-selected playing cards of said second poker hand.

22. The method of claim 15, which includes, if a playing card nudge triggering event occurs in association with the first poker hand after none of said playing cards in said first poker hand are designated to be discarded:

causing the at least one processor to execute the plurality of instructions to select at least one of the playing cards of said first poker hand, and for each selected playing card:
- (A) causing the at least one processor to execute the plurality of instructions to select a nudge playing card from the set of playing cards, wherein said selection is based, at least in part, on the selected playing card, and
- (B) causing the at least one display device to display the selected nudge playing card replacing said selected playing card in said first poker hand.

23. The method of claim 22, wherein if the playing card nudge triggering event occurs in association with the first poker hand after none of said playing cards in said first poker hand are designated to be discarded, the selection of the nudge playing card is based, at least in part, on at least one of the non-selected playing cards of said first poker hand.

24. The method of claim 15, which is provided through a data network.

25. The method of claim 24, wherein the data network is an internet.

26. A method of operating a gaming system, said method comprising:
- (a) if a physical item is received via an acceptor, establishing a credit balance based, at least in part, on a monetary value associated with the received physical item,
- (b) after establishing the credit balance based, at least in part, on the monetary value indicated by the received physical item:
  - (i) causing at least one processor to execute a plurality of instructions to randomly select a plurality of playing cards from a set of playing cards,
  - (ii) causing at least one display device to display a first poker hand including said randomly selected plurality of playing cards,
  - (iii) enabling a designation of at least one of said playing cards in said first poker hand to be discarded,
  - (iv) for each playing card designated to be discarded:
    - (A) causing the at least one processor to execute the plurality of instructions to randomly select a replacement playing card from the set of playing cards, and
    - (B) causing the at least one display device to display the randomly selected replacement playing card replacing the playing card in the first poker hand designated to be discarded, wherein any held playing cards, any selected nudge playing cards and any selected replacement playing cards form a second poker hand,
  - (v) if a playing card nudge triggering event occurs in association with the second poker hand:
    - (A) causing the at least one processor to execute the plurality of instructions to select at least one of the playing cards of said second poker hand, and
    - (B) for each selected playing card:
      - (I) causing the at least one processor to execute the plurality of instructions to select a nudge playing card from the set of playing cards, wherein said selection is based, at least in part, on the selected playing card, and
      - (II) causing the at least one display device to display the selected nudge playing card replacing said selected playing card in said second poker hand,
  - (vi) causing the at least one processor to execute the plurality of instructions to determine if the second poker hand is associated with any awards, and
  - (vii) providing any awards associated with the second poker hand, wherein the credit balance is increasable based on any awards associated with the second poker hand, and
- (c) if a cashout input is received via a cashout device, causing an initiation of a payout associated with the credit balance.

27. The method of claim 26, wherein for each selected playing card, said selection of the nudge playing card is based on nudging said selected playing card by at least one rank.

28. The method of claim 26, wherein for each selected playing card, said selection of the nudge playing card is based on nudging said selected playing card by at least one suit.

29. The method of claim 26, wherein for each selected playing card, said selection of the nudge playing card is based on nudging said selected playing card by at least one rank and at least one suit.

30. The method of claim 26, wherein if the playing card nudge triggering event occurs in association with the second poker hand, the selection of the nudge playing card is based, at least in part, on at least one of the non-selected playing cards of said second poker hand.

31. The method of claim 26, which is provided through a data network.

32. The method of claim 31, wherein the data network is an internet.

* * * * *